United States Patent [19]
Loftus, Jr., deceased et al.

[11] Patent Number: 5,872,705
[45] Date of Patent: *Feb. 16, 1999

[54] LOW LOSS SYNCHRONOUS RECTIFIER FOR APPLICATION TO CLAMPED-MODE POWER CONVERTERS

[75] Inventors: Thomas Patrick Loftus, Jr., deceased, late of Mesquite; by Marvin R. Thomas, executor, Dallas; Allen Frank Rozman, Richardson, all of Tex.

[73] Assignee: Lucent Technologies Inc., Murray Hill, N.J.

[ * ] Notice: The term of this patent shall not extend beyond the expiration date of Pat. No. 5,528,482.

The term of this patent shall not extend beyond the expiration date of Pat. No. 5,303,138. 5,

[21] Appl. No.: 704,056

[22] Filed: Aug. 28, 1996

Related U.S. Application Data

[63] Continuation of Ser. No. 516,423, Aug. 17, 1995, abandoned, which is a continuation of Ser. No. 225,027, Apr. 8, 1994, Pat. No. 5,528,482, which is a continuation-in-part of Ser. No. 54,918, Apr. 29, 1993, Pat. No. 5,303,138.

[51] Int. Cl.$^6$ .................................................. H02M 3/335
[52] U.S. Cl. ................................ 363/21; 363/89; 363/97; 363/127; 363/131
[58] Field of Search ................................ 363/39, 20, 21, 363/47, 91, 97, 89, 127, 131; 327/309

[56] References Cited

U.S. PATENT DOCUMENTS

| | | | |
|---|---|---|---|
| 4,675,797 | 6/1987 | Vinciarelli | 363/21 |
| 5,066,900 | 11/1991 | Bassett | 323/224 |
| 5,126,931 | 6/1992 | Jitaru | 363/21 |
| 5,274,543 | 12/1993 | Loftus, Jr. | 363/127 |
| 5,303,138 | 4/1994 | Rozman | 363/21 |
| 5,528,482 | 6/1996 | Rozman | 363/21 |
| 5,535,112 | 7/1996 | Vazquez Lopez | 363/20 |

OTHER PUBLICATIONS

Acker, Brian et al., *1994 IEEE*, "Current–Controlled Synchronous Rectification," University of California, Berkeley, CA, pp. 185–191.

Jitaru, Ionel Dan et al., *1994 IEEE*, "High Efficiency DC–DC Converter," Polytechnic Institute of Bucharest, Bucharest, Romania, pp. 638–644.

*Primary Examiner*—Shawn Riley
*Attorney, Agent, or Firm*—Robert R. Axenfeld

[57] ABSTRACT

A synchronous rectifier for use with a clamped-mode power converter uses in one embodiment a hybrid rectifier with a MOSFET rectifying device active in one first cyclic interval of the conduction/nonconduction sequence of the power switch and a second rectifying device embodied in one illustrative embodiment as a low voltage diode rectifying device active during an alternative interval to the first conduction/nonconduction interval. The gate drive to the MOSFET device is continuous at a constant level for substantially all of the second interval which enhances efficiency of the rectifier. The diode rectifier device may also be embodied as a MOSFET device. The subject rectifier may be used in both forward and flyback power converters.

12 Claims, 4 Drawing Sheets

LOW LOSS SYNCHRONOUS RECTIFIER FOR APPLICATION TO CLAMPED-MODE POWER CONVERTERS

This is a continuation of application Ser. No. 08/516,423, filed Aug. 17, 1995, now abandoned, which is a continuation of application Ser. No. 08/225,027 filed Apr. 8, 1994 which is a continuation in part of application Ser. No. 08/054,918 filed on Apr. 29, 1993 now U.S. Pat. No. 5,528,482 issued on Jun. 18, 1996 and U.S. Pat. No. 5,303,138 issued on Apr. 12, 1994, respectively.

FIELD OF THE INVENTION

This invention relates to switching type power converters and in particular to forward and flyback converters having a clamp-mode topology.

BACKGROUND OF THE INVENTION

Self synchronized rectifiers refer to rectifiers using MOS-FET rectifying devices having control terminals which are driven by voltages of the windings of the power transformer in order to provide the rectification of the output of the transformer. Use of synchronous rectifiers has been limited however by the inefficiency of these rectifiers in buck derived converter topologies. Efficiency is limited due to the nature of switching of buck derived converters (i.e buck, buck-boost, boost converters including forward and flyback topologies) and due to the variability of the transformer reset voltages in the forward type converters. This variability of reset voltage limits the conduction time of one of the MOSFET rectifiers, diminishing the effectiveness and efficiency of the rectifier. This is because the rectifying devices do not conduct for the full switching period and the gate drive energy of one of the rectifiers is dissipated.

SUMMARY OF THE INVENTION

A synchronous rectifier is combined with a clamped-mode buck derived power converter. In one illustrative embodiment a hybrid rectifier includes a MOSFET rectifying device active in a first cyclic interval of the conduction/nonconduction sequence of the power switch. A second rectifying device embodied in one illustrative embodiment as a low forward voltage drop diode rectifying device is active during an alternative interval to the first conduction/nonconduction interval. The gate drive to the MOSFET device is maintained continuous at a constant level for substantially the all of the second interval by the clamping action of the clamping circuitry of the converter. This continuous drive enhances the efficiency of the rectifier.

The bipolar rectifier device may also be embodied as a MOSFET device in a rectifier using two MOSFET devices. The subject rectifier may be used in both forward and flyback power converters.

DETAILED DESCRIPTION

Figure 1:
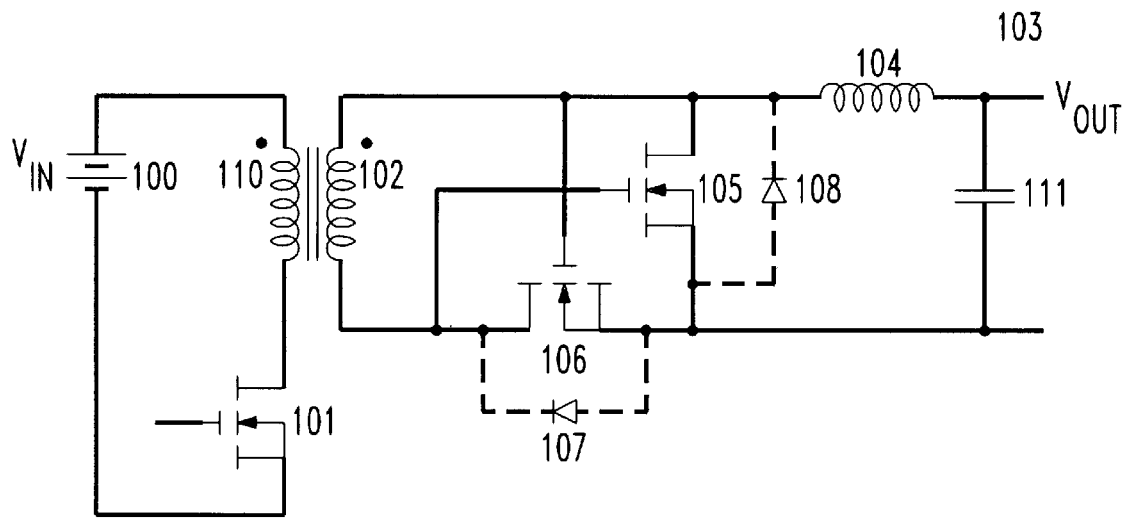
FIG. 1 is a schematic of a forward converter, of the prior art, having a synchronous rectifier.

In the converter shown in the FIG. 1, a conventional forward topology of the prior art with an isolating power transformer is combined with a self synchronized synchronous rectifier. In such a rectifier controlled devices are used with the control terminals being driven by an output winding of the power transformer.

A DC voltage input $V_{in}$, at input 100, is connected to the primary winding 110 of the power transformer by a MOSFET power switch 101. The secondary winding 102 is connected to an output lead 103 through an output filter inductor 104 and a synchronous rectifier including the MOSFET rectifying devices 105 and 106. Each rectifying device includes a body diode 108 and 107, respectively.

With the power switch 101 conducting, the input voltage is applied across the primary winding 110. The secondary winding 102 is oriented in polarity to respond to the primary voltage with a current flow through the inductor 104, the load connected to output lead 103 and back through the MOSFET rectifier 106 to the secondary winding 102. Continuity of current flow in the inductor 104 when the power switch 101 is non-conducting, is maintained by the current path provided by the conduction of the MOSFET rectifier 105. An output filter capacitor 111 shunts the output of the converter.

Figure 2:
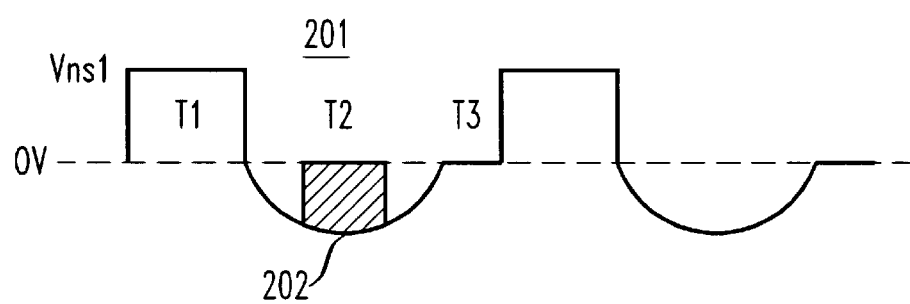
FIG. 2 is a voltage waveform of the secondary transformer winding of the converter of FIG. 1.

Conductivity of the MOSFET rectifiers is controlled by the gate drive signals provided by the voltage appearing across the secondary winding 102. This voltage is shown graphically by the voltage waveform 201 in FIG. 2. During the conduction interval $T_1$ of the power switch 101, the secondary winding voltage $V_{ns1}$ charges the gate of MOSFET 106 to bias it conducting for the entire interval $T_1$. The MOSFET 105 is biased non conducting during the $T_1$ interval. The conducting MOSFET rectifying device 106 provides the current path allowing energy transfer to the output during the interval $T_1$. The gate of MOSFET rectifier 106 is charged in response to the input voltage $V_{in}$. All of the gate drive energy due to this voltage is dissipated.

As the power MOSFET switch 101 turns off, the voltage $V_{ns1}$ across the secondary winding 102 reverses polarity just as the time interval $T_2$ begins. This voltage reversal initiates a reset of the transformer magnetizing inductance, resonantly discharges the gate of MOSFET rectifier 106 and begins charging the gate of MOSFET rectifier 105. As shown by the voltage waveform of FIG. 2, the voltage across the secondary winding 102 is not a constant value, but is rather a variable voltage that collapses to zero in the subsequent time interval $T_3$, which occurs prior to the subsequent conduction interval of the power switch 101. This voltage is operative to actually drive the rectifier 105 conducting over only a portion of the time interval $T_2$ which is indicated by the cross hatched area 202 associated with the waveform 201 in FIG. 2. This substantially diminishes the performance of the rectifier 105 as a low loss rectifier device. This is aggravated by the fact that the body diode 108 of the rectifier 105 has a large forward voltage drop which is too large to efficiently carry the load current.

The loss of efficiency of the synchronous rectifier limits the overall efficiency of the power converter and has an adverse effect on the possible power density attainable. Since the synchronous rectifier 105 does not continuously conduct throughout the entire switching period, a conventional rectifier diode (e.g. connected in shunt with rectifier 105) capable of carrying the load current is required in addition to MOSFET rectifier 105. This inefficiency is further aggravated by the gate drive energy dissipation associated with the MOSFET rectifier 106. This gate drive loss may exceed the conduction loss for MOSFET rectifier 106, at high switching frequency (e.g. >300 kHz).

Figure 3:
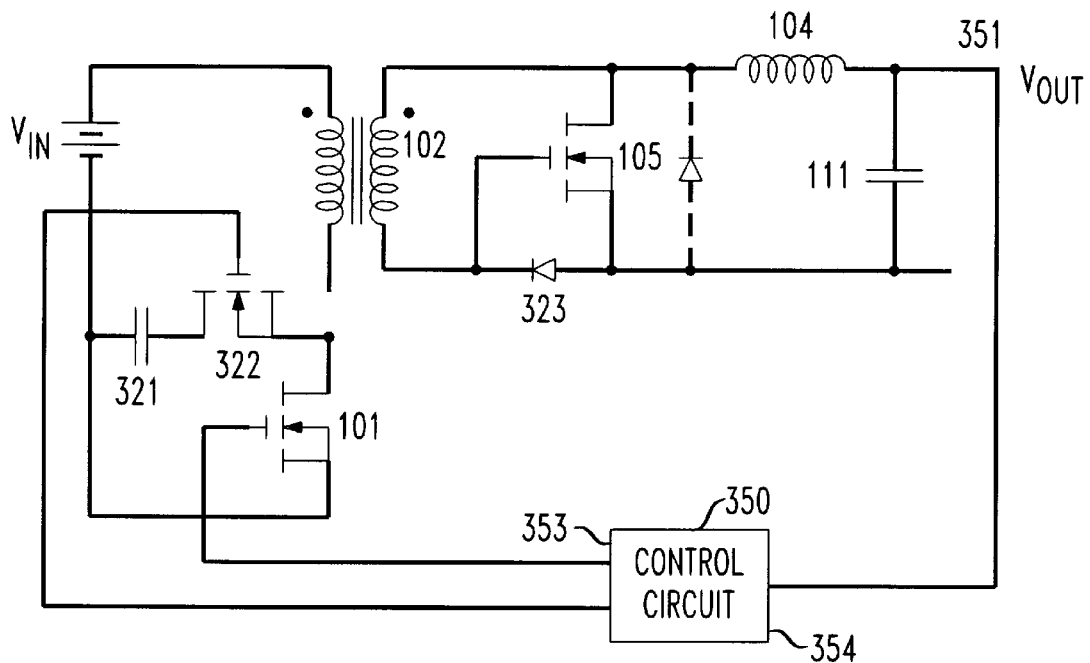
FIG. 3 is a schematic of a clamped-mode forward converter with a synchronous rectifier embodying the principles of the invention.

The efficiency of a forward converter with synchronous rectification is significantly improved according to the invention by using a clamp circuit arrangement to limit the reset voltage and by using a low forward voltage drop diode in the rectifying circuitry. Such an arrangement is shown in the schematic of FIG. 3. In this forward power converter, the power MOSFET device 101 is shunted by a series connection of a clamp capacitor 321 and a MOSFET switch device 322. The conducting intervals of power switch 101 and MOSFET device 322 are mutually exclusive. The duty cycle of power switch 101 is D and the duty cycle of MOSFET device 322 is 1−D. The voltage inertia of the capacitor 321 limits the amplitude of the reset voltage appearing across the magnetizing inductance during the non conducting interval of the MOSFET power switch 101.

The diode 323 of the synchronous rectifier, shown in FIG. 3, has been substituted for the MOSFET device 106 shown in the FIG. 1. Due to the dissipation of gate drive energy the overall contribution of the MOSFET rectifier 106 in FIG. 1 is limited. The clamping action of the clamping circuitry results in the constant voltage level 402 shown in the voltage waveform 401, across the secondary winding 102, in the time period $T_2$. This constant voltage applied to the gate drive of the MOSFET rectifier 105 drives it into conduction for the entire $T_2$ reset interval. In this arrangement there is no need for a bipolar or a body diode shunting the MOSFET rectifier 105. An advantage in the clamped mode converter is that the peak inverse voltage applied to the diode 323 is much less than that applied to the similarly positioned MOSFET device in FIG. 1. Accordingly the diode 323 may be a very efficient low voltage diode which may be embodied by a low voltage diode normally considered unsuitable for rectification purposes.

Figure 4:
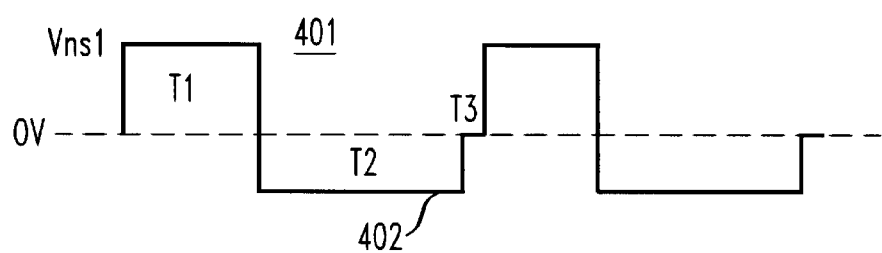
FIG. 4 is a voltage waveform of the secondary transformer winding of the converter of FIG. 3.

In the operation of the clamped mode forward converter the MOSFET switch 322 is turned off just prior to turning the MOSFET power switch 101 on. Energy stored in the parasitic capacitances of the MOSFET switching devices 101 and 322 is commutated to the leakage inductance of the power transformer, discharging the capacitance down toward zero voltage. During the time interval $T_3$, shown in FIG. 4, voltage across the primary winding is supported by the leakage inductance. The voltage across the secondary winding 102 drops to zero value as shown in the FIG. 4. With this zero voltage level of the secondary winding, the output inductor resonantly discharges the gate capacitance of the MOSFET rectifying device 105 and eventually forward biases the bipolar diode 323. The delay time $T_3$ is a fixed design parameter and is a factor in the control of the power switches 101 and 322, which may be switched to accommodate soft waveforms. This synchronous rectification circuit of FIG. 3 provides the desired efficiencies lacking in the arrangement of the circuit shown in FIG. 1.

Control of the conductivity of the power switching devices 101 and 322 is by means of a control circuit 350, which is connected, by lead 351, to an output terminal 103 of the converter to sense the output terminal voltage. The control circuit 350 is connected, by leads 353 and 354, to the drive terminals of the power switches 101 and 322. The drive signals are controlled to regulate an output voltage at the output terminal. The exact design of a control circuit, to achieve the desired regulation, is well known in the art and hence is not disclosed in detail herein. This control circuit 350, is suitable for application to the converters of FIGS. 5, 6, 7 and 8.

Figure 5:
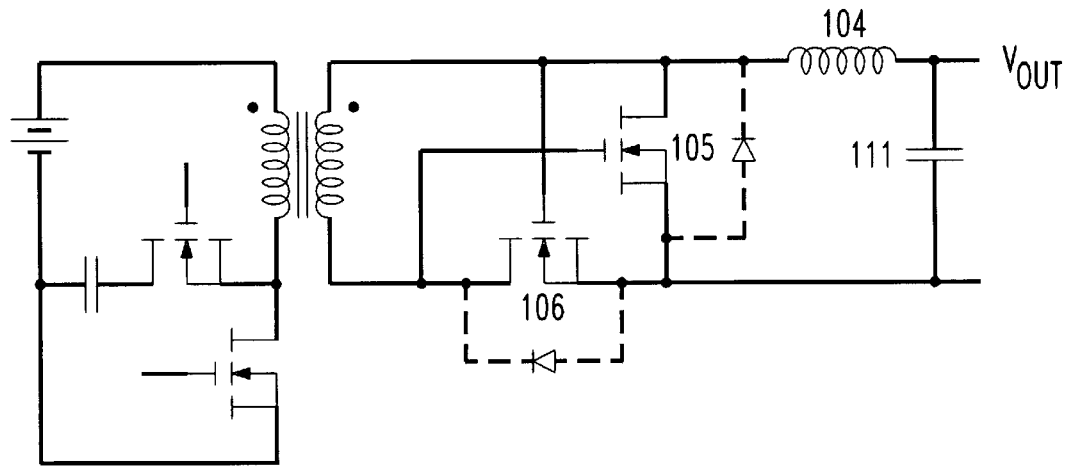
FIG. 5 is a schematic of another version of a clamped-mode forward converter with a synchronous rectifier embodying the principles of the invention.

A modified version of the circuit of FIG. 3 is shown in the circuit schematic of the FIG. 5. The converter of FIG. 5 is a clamped mode forward converter having two gated synchronous rectifying devices 105 and 106. In this embodiment of the synchronous rectifier the synchronized rectifying device 106 can be used without adversely affecting the converter efficiency at lower operating frequencies.

Figure 6:
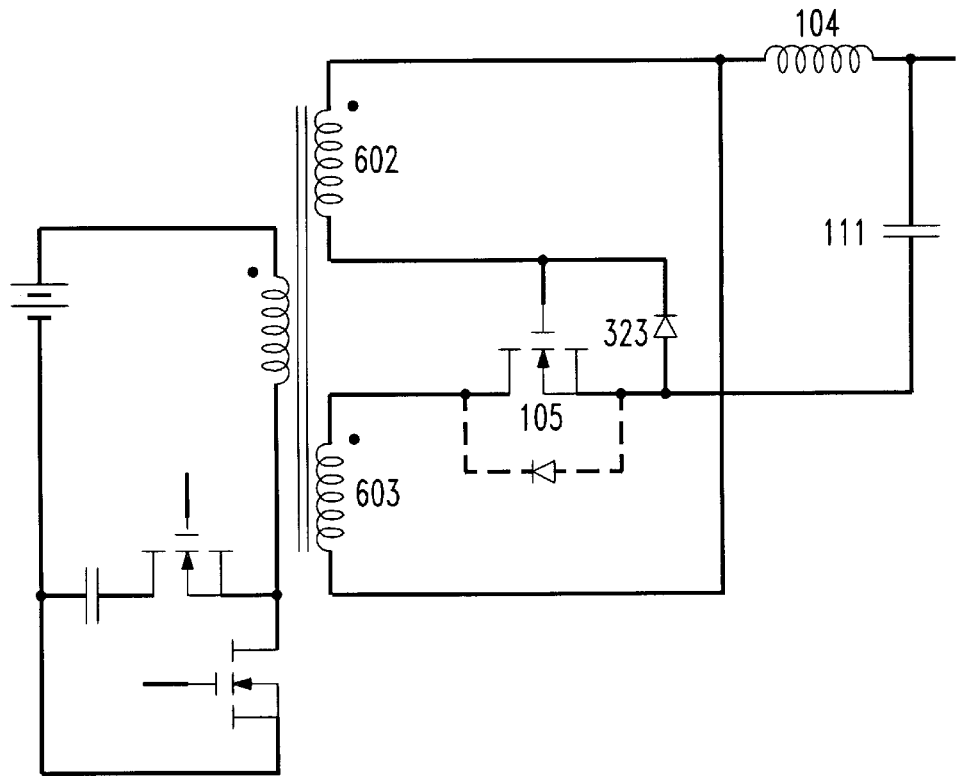
FIG. 6 is a schematic of another version of a clamped-mode forward converter with a synchronous rectifier and a center tapped secondary winding embodying the principles of the invention.

The circuit of FIG. 6 is a clamped mode forward converter having a rectifier analogous to that of FIG. 3 in using one bipolar rectifying diode. The secondary winding is tapped creating two secondary winding segments 603 and 602.

Figure 7:
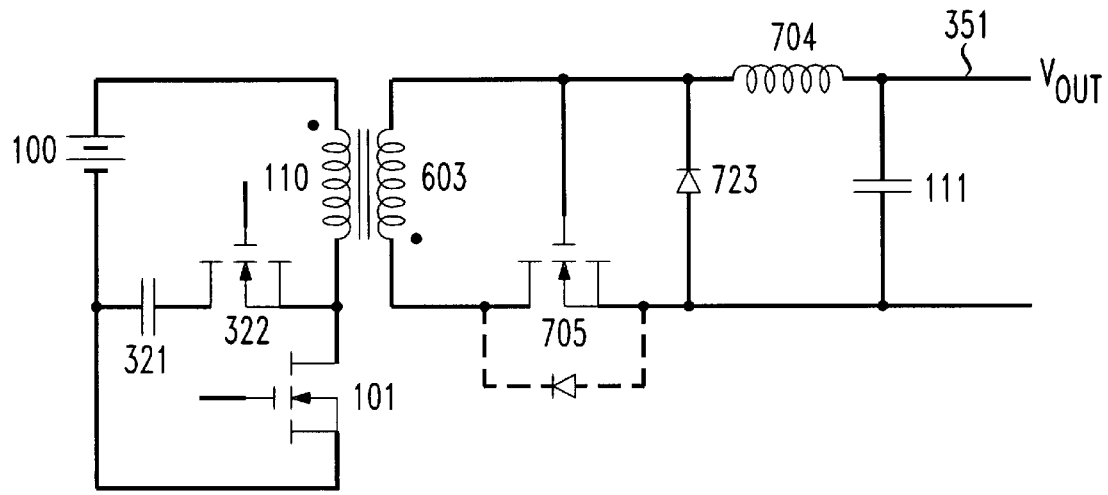
FIG. 7 is a schematic of a clamped-mode flyback converter with a synchronous rectifier embodying the principles of the invention.
Figure 8:
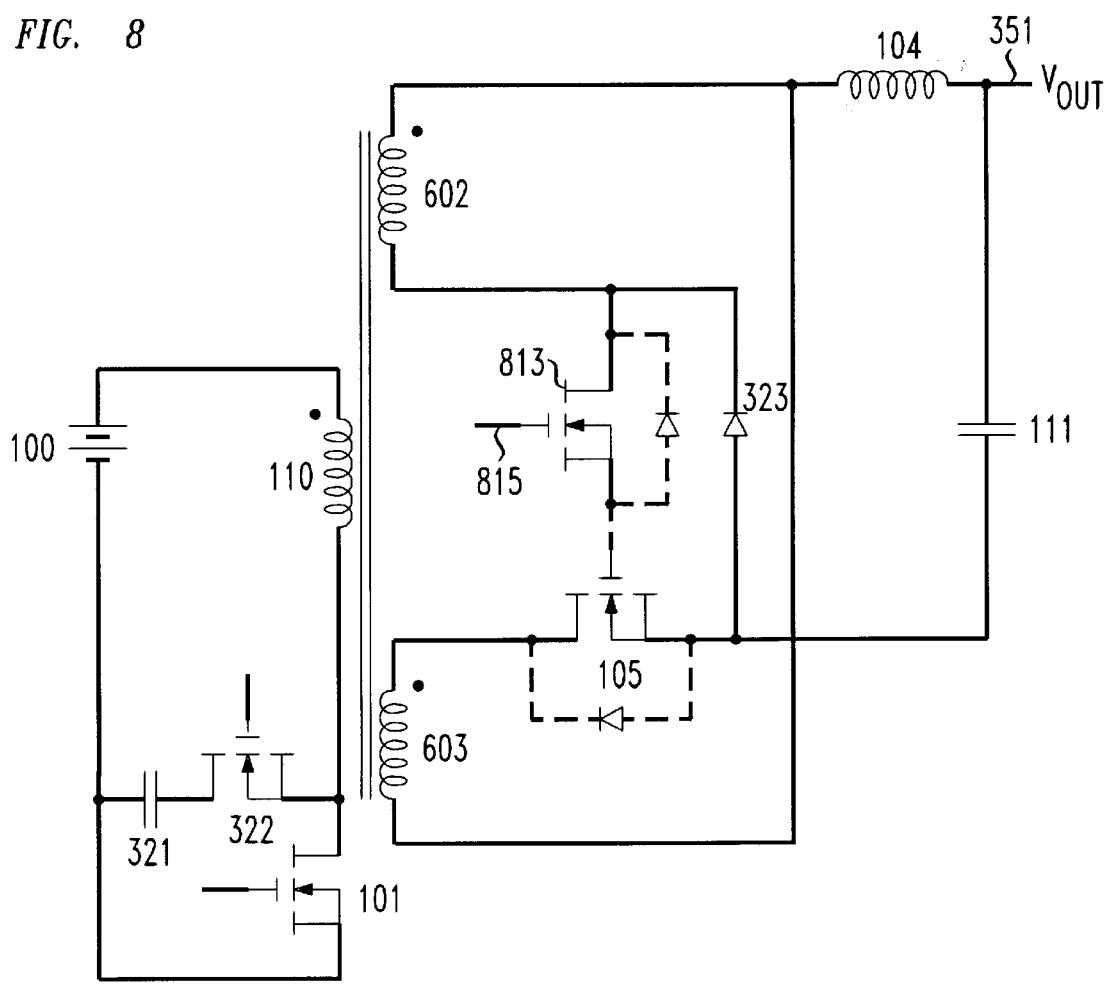
FIG. 8 is a schematic of another version of a clamped-mode forward converter with a synchronous rectifier and a center tapped secondary winding embodying the principles of the invention.

The converter of FIG. 7 operates in a flyback mode. The bipolar and synchronous rectifier device are in a reversed connection from the connection of FIG. 3 to accommodate the flyback operation.

In some applications direct application of the gate drive signal directly from the secondary winding may result in voltage spikes exceeding the rating of the gate. A small signal MOSFET device 813 is connected to couple the gate drive to the MOSFET rectifying device 105. This device may be controlled by the control drive lead 815 to limit the peak voltage applied to the gate of rectifier 105. The MOSFET synchronous rectifier is then discharged through the body diode of the MOSFET device 813.

The mention claimed is:

1. A power converter for providing load current to a load comprising:

an input for accepting a DC voltage;

a power transformer including a primary and first and second secondary windings;

a power switch for periodically connecting the input to the primary winding;

an output for accepting a load to be energized;

clamping means for limiting a voltage across the first and second secondary windings during a specified first interval of a cyclic period of the power converter;

a rectifier circuit connected to the output and including:
  a FET synchronous rectification device including a conduction control terminal and having a conduction path controlled by the conduction control terminal, and the conduction path connected to enable conduction of the load current during the clamping means; and
  a FET drive device having a conduction path coupled to supply a drive signal to the conduction control terminal of the FET synchronous rectification device from the second secondary winding and connected for limiting a voltage level of the drive signal applied by the second secondary winding.

2. A power converter for providing load current to a load comprising:

an input for accepting a DC voltage;

a power transformer including a primary and a secondary winding;

a power switch for periodically connecting the input to the primary winding;

an output for accepting a load to be energized;

clamping means for limiting a voltage across the primary and secondary windings during a first interval of a cyclic period of the power converter;

a rectifier circuit connected to the output and comprising:
 a first FET synchronous rectification device including a conduction control terminal and having a conduction path controlled by the conduction control terminal, and the conduction path connected to enable conduction of the load current during the first interval; and a first FET drive device having a conduction path coupled to supply drive to the conduction control terminal of the first FET synchronous rectification device from the secondary winding and connected for limiting a voltage level of the drive signal applied by the secondary winding; and a second FET synchronous rectification device including a conduction control terminal and having a conduction path controlled by the conduction control terminal of the second FET, and the conduction path connected to enable conduction of the load current during a second interval other than the first interval.

3. The power converter of claim 1 or 2 wherein the converter is connected to operate as a forward type converter.

4. The power converter of claim 1 or 2 wherein the converter is connected to operate as a flyback type converter.

5. A power converter for providing load current to a load comprising:

an input for accepting a DC voltage;

a power transformer including a primary and a secondary winding;

a power switch for periodically connecting the input to the primary winding;

an output for accepting the load to be energized;

clamping means for limiting a voltage across the primary and secondary windings during a first interval of a cyclic period of the power converter;

a rectifier circuit connected to the output and comprising:
 a FET synchronous rectification device including a conduction control terminal and having a conduction path controlled by the conduction control terminal, and the conduction path connected to enable conduction of the load current during the first interval; and a FET drive device having a conduction path coupled to supply drive to the conduction control terminal of the FET synchronous rectification device from the secondary winding and connected for limiting a voltage level of the drive signal applied by the secondary winding; and a rectifier connected for enabling a conduction of the load current during a second interval other than the first interval.

6. In a power converter, for DC-to-DC conversion and having a primary and secondary circuit coupled magnetically by a transformer, comprising:

the primary circuit comprising:
 (a) input for accepting DC voltage and a power switch periodically enabled for coupling the DC voltage to a primary winding of the transformer;
 (b) a clamping circuit for clamping a voltage of the primary winding during a non-conduction of the power switch and including a control switch and a voltage storage component; the secondary circuit comprising:
 (a) a first and second winding, for producing a drive signal;
 (b) a rectifying circuit for coupling at least one of the first and second windings to an output for supplying DC voltage to a load, the rectifying circuit comprising at least a first FET synchronous rectifying device connected to be energized into conduction by at least one of the first and second windings, said FET synchronous rectifying device having a gate control terminal configured to receive said drive signal;
 (c) a FET drive device connected to said gate control terminal of the first FET synchronous rectifying device and connected for limiting a voltage level of the drive signal applied by one of the first and second secondary windings to said gate control terminal.

7. In a power converter, for DC-to-DC conversion as claimed in claim 10, comprising a second rectifying device for providing continuous current to the output during non-conduction of the first rectifying device.

8. (Reformatted) In a power converter, for DC-to-DC conversion and having a primary and secondary circuit coupled magnetically by a transformer, comprising:

the primary circuit including:
 an input for accepting DC voltage and a power switch periodically enabled for coupling the DC voltage to a primary winding of the transformer;
 a clamping circuit for clamping a voltage of the primary winding during a non-conduction of the power switch and including a control switch and a voltage storage component;

the secondary circuit including:
 a secondary transformer winding configured to generate a drive signal having a voltage level;
 a rectifying circuit for coupling the secondary transformer winding to an output for supplying DC voltage to a load;
 the rectifying circuit comprising at least a first FET synchronous rectifying device connected to be energized into conduction by the secondary transformer winding;
 a FET drive device, connected to a control drive electrode of the first FET synchronous rectifying device, for limiting the voltage level of the drive signal applied by the secondary transformer winding to the control drive electrode.

9. In a power converter, for DC-to-DC conversion as claimed in claim 8, comprising a second rectifying device for providing continuous current to the output during non-conduction of the first rectifying device.

10. In a power converter, for DC-to-DC voltage conversion and having a primary and secondary circuit coupled magnetically by a transformer, wherein the primary circuit is operable for providing a bipolar voltage to a primary winding of the transformer, said secondary circuit comprising:
 (a) a secondary transformer winding for producing a drive signal having a voltage level;
 (b) a rectifying circuit for coupling the secondary transformer winding to an output for supplying DC voltage to a load, said rectifying circuit having at least one FET synchronous rectifying device connected to be energized into conduction by the secondary transformer winding, said FET synchronous rectifying device having a gate drive control terminal for receiving said drive signal; and (c) a first FET drive device connected to the gate drive control terminal of the FET synchronous rectifying device for limiting the voltage level of the drive signal applied by the secondary winding to the gate drive control terminal.

11. A power converter, for DC-to-DC voltage conversion and having a primary and secondary circuit coupled magnetically by a transformer, comprising:

the primary circuit comprising an input for accepting the DC voltage, and a power switch periodically enabled for coupling the DC voltage to a primary winding of the transformer;

the secondary circuit comprising:

(a) a secondary transformer winding for producing a drive signal having a voltage level;

(b) a rectifying circuit for coupling the secondary transformer winding to an output for supplying DC voltage to a load, said rectifying circuit having at least one FET synchronous rectifying device connected to be energized into conduction by the secondary transformer winding, said FET synchronous rectifying device having a gate drive control terminal for receiving said drive signal; and (c) a first FET drive device connected to the gate drive control terminal of the FET synchronous rectifying device for limiting the voltage level of the drive signal applied by the secondary winding to the gate drive control terminal.

12. A power converter, having and input and an output, comprising:

a transformer having a plurality of windings;

a power switch for periodically connecting one of said windings to said input;

a clamping circuit for limiting the amplitude of a voltage across said transformer windings during a clamping interval of a cyclic period of said power converter; and a rectifier circuit for providing current to a load, comprising:

a synchronous rectification device having a conduction control terminal, said conduction control terminal connected to be responsive to said voltage across at least one of said windings such that said synchronous rectification device is biased conducting for substantially all of said clamping interval, and a rectifier device biased conducting during substantially all of a second interval other than said clamping interval.

\* \* \* \* \*